F. H. NULLMEYER & C. A. PORATH.
WIRE CUTTING MACHINE.
APPLICATION FILED DEC. 29, 1911.
1,036,311.
Patented Aug. 20, 1912.
5 SHEETS—SHEET 1.
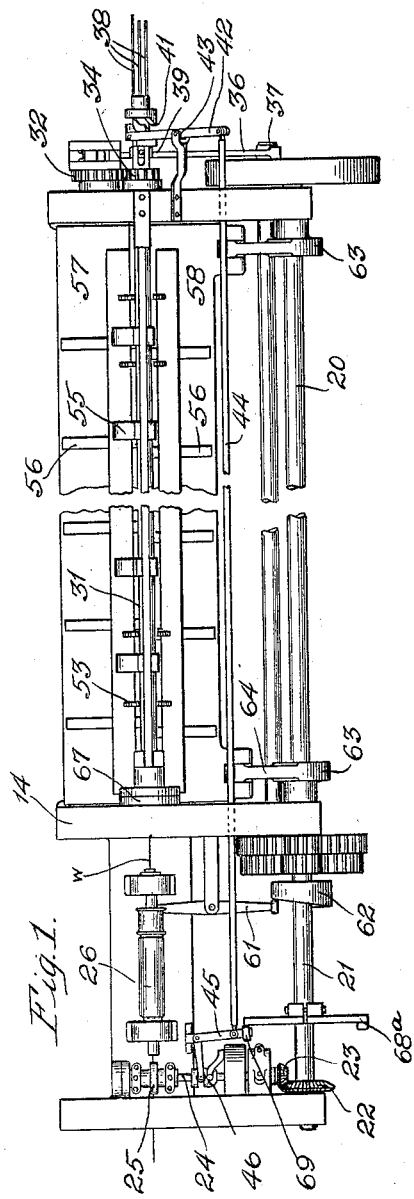
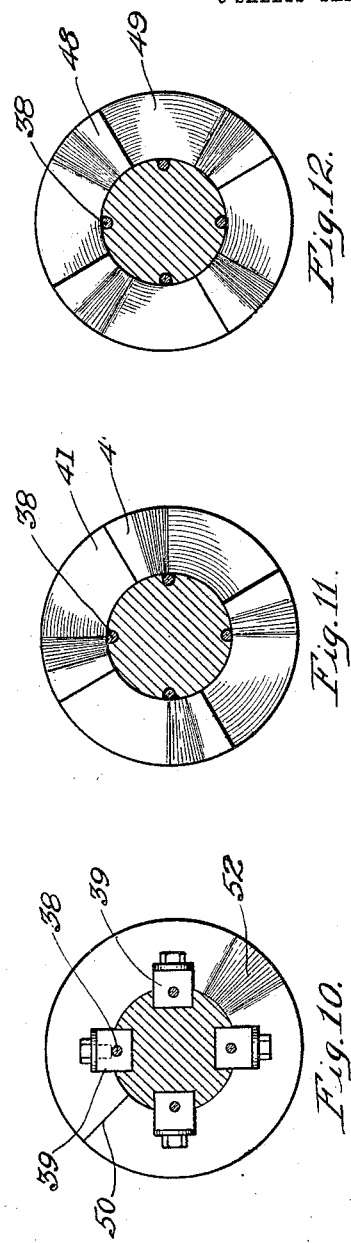
Witnesses:
Inventors:
Frank H. Nullmeyer
Carl A. Porath
BY
Attorneys.

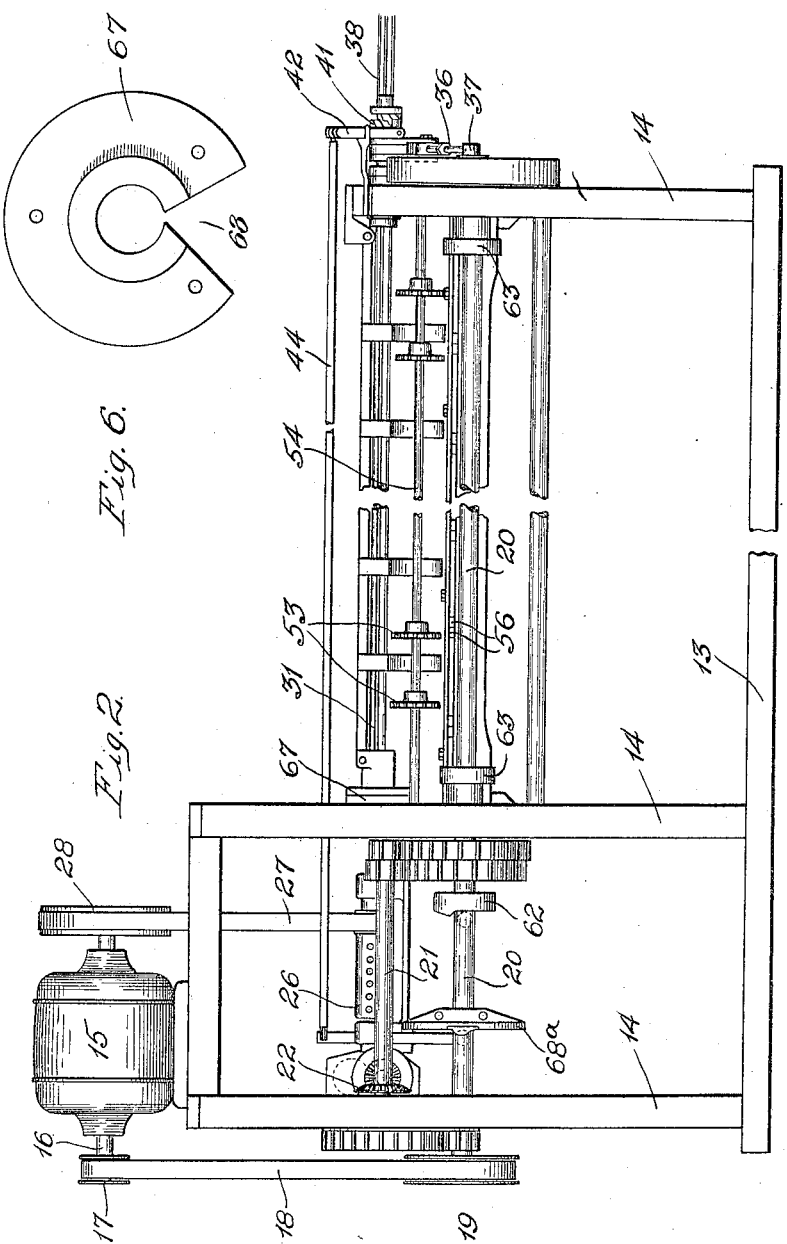

F. H. NULLMEYER & C. A. PORATH.
WIRE CUTTING MACHINE.
APPLICATION FILED DEC. 29, 1911.
1,036,311.
Patented Aug. 20, 1912.
5 SHEETS—SHEET 3.
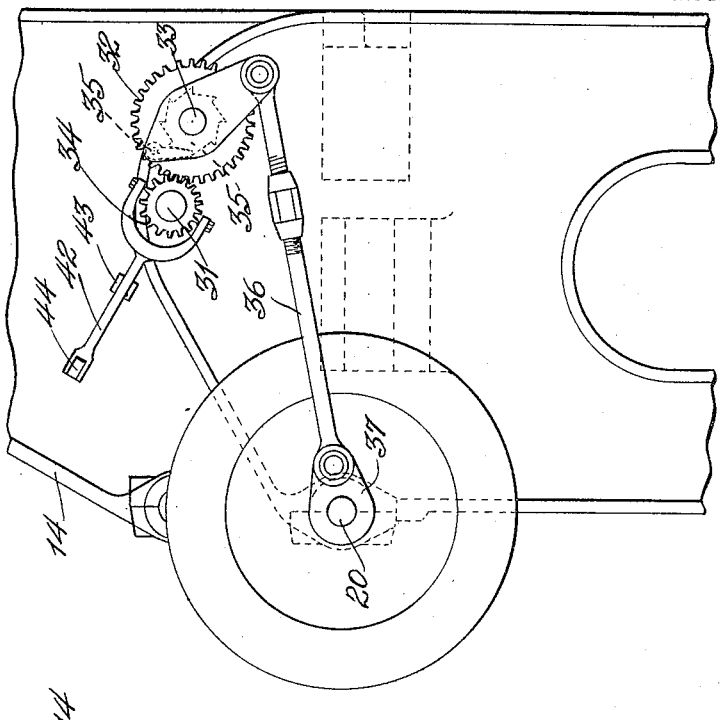

F. H. NULLMEYER & C. A. PORATH.
WIRE CUTTING MACHINE.
APPLICATION FILED DEC. 29, 1911.
1,036,311.
Patented Aug. 20, 1912.
5 SHEETS—SHEET 5.
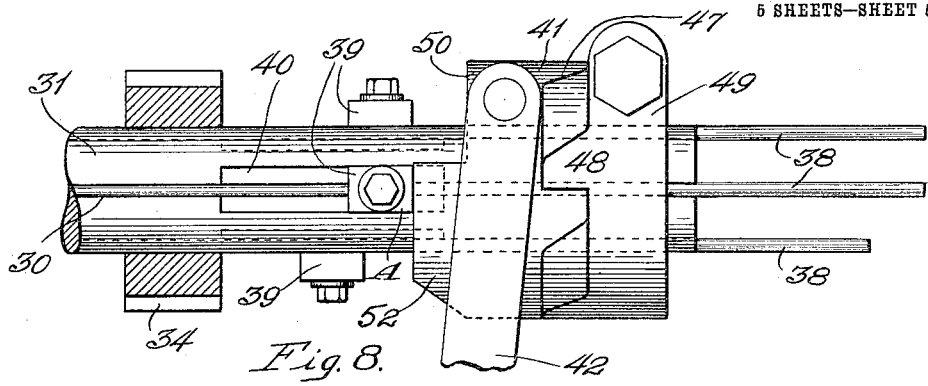
Fig. 8.
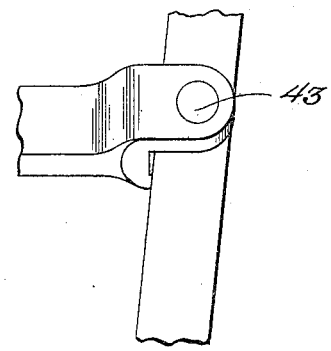
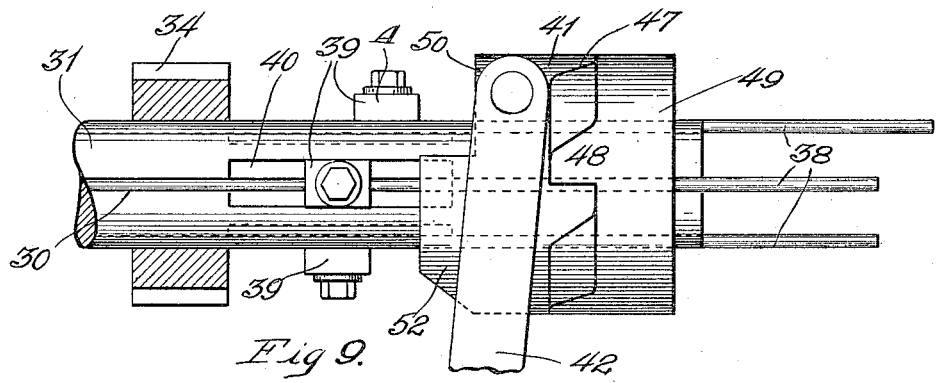
Fig. 9.
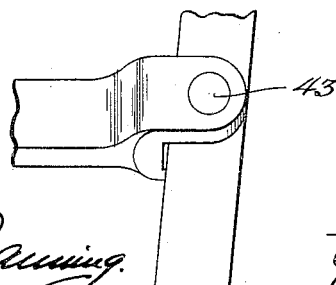
Witnesses:
Inventors:
Frank H. Nullmeyer
Carl A. Porath
BY
Attorneys.
COLUMBIA PLANOGRAPH CO., WASHINGTON, D. C.

UNITED STATES PATENT OFFICE.

FRANK H. NULLMEYER AND CARL A. PORATH, OF STRUTHERS, OHIO, ASSIGNORS TO THE YOUNGSTOWN SHEET & TUBE COMPANY, OF YOUNGSTOWN, OHIO, A CORPORATION OF OHIO.

WIRE-CUTTING MACHINE.

1,036,311. Specification of Letters Patent. Patented Aug. 20, 1912.

Application filed December 29, 1911. Serial No. 668,421.

*To all whom it may concern:*

Be it known that we, FRANK H. NULLMEYER and CARL A. PORATH, both citizens of the United States, residing at Struthers, in the county of Mahoning and State of Ohio, have invented certain new and useful Improvements in Wire-Cutting Machines, of which the following is a specification.
The present invention relates to a mechanism for automatically cutting wire into desired lengths.

The objects of the present invention are: To perform this cutting operation entirely by mechanical means, no manual handling of the wire being necessary from the time it leaves the roll or main body of wire until it is cut into the desired lengths; to provide adjustable cutting mechanism whereby the size of the cut sections can be varied as desired; to provide a receptacle or holder to receive the wire fed from the main roll; to provide means for severing a piece of wire placed within the holder from the main roll;
to provide means for conveying the piece of wire thus placed in the holder into position to be acted upon by the cutters; and to accurately position the piece of wire to be cut into sections with respect to the cutting mechanism.

Further objects of the present invention are: To actuate the holder to permit of the placing of a new piece of wire therein; to provide means for stopping the feed of the wire from the main roll during the periods of movement of the holder and for resuming the feeding operation after the holder has been brought to rest; to provide mechanism which will be actuated in accordance with the fed wire for stopping the movements of the feeding mechanism; and to render said means adjustable, so that a piece of wire of any desired length may be placed in the holder.
The invention further consists in the features of construction and combination of parts hereinafter described and claimed.

Figure 5:
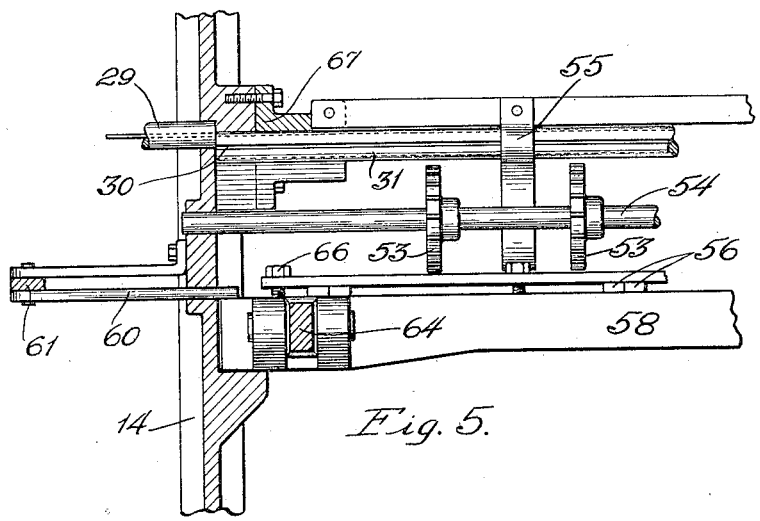
Figure 7:
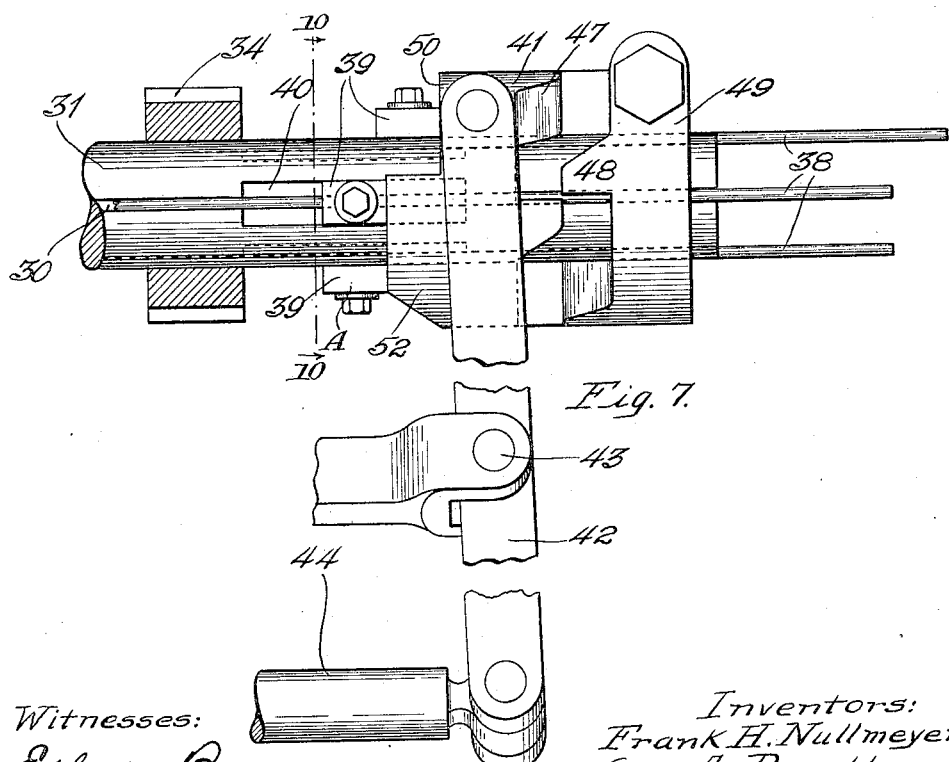

In the drawings, Figure 1 is a plan view of the machine of the present invention;
Fig. 2 is a side elevation; Fig. 3 is a detail, partly in section, of the cutting and delivery mechanism; Fig. 4 is a detail of the connection between the holder and the actuating means therefor, and showing a portion of the mechanism for making and breaking the feed of the wire; Fig. 5 is a detail, partly in section, of the delivery mechanism, cutting mechanism, and the means for positioning the wire with respect to the cutting mechanism; Fig. 6 is a detail of one of the plates forming the bearing for the holder; Fig. 7 is an enlarged detail of one end of the holder, and showing a portion of the mechanism for controlling the operation of the feeding mechanism, in which view the parts are shown in the position they assume while the wire is being fed into the holder; Fig. 8 is a view similar to Fig. 7, showing the position the parts assume just at the time when the feeding operation has been stopped; Fig. 9 is a view similar to Fig. 7, showing the position the parts assume when the holder has nearly completed its period of movement; Fig. 10 is a section on line 10—10 of Fig. 7, looking in the direction of the arrow; Fig. 11 is a face view of the movable collar of the feed controlling mechanism; Fig. 12 is a detail of the fixed collar of said controlling mechanism.

As stated, the present invention is more especially intended and adapted for use in cutting wire into suitable lengths for any desired purpose, as, for instance, to form the stays of a square mesh fence fabric. In certain types of machines for making this fencing, more particularly those known as the hopper machines, the stays must be cut and placed in the hoppers prior to their being fed into the fence forming mechanism. It is, of course, necessary that such sections be of the exact length required, and vast quantities of them are used in the manufacture of fencing, so that the operation of cutting them must be attended by speed and accuracy.

The machine of the present invention is designed and adapted for use in cutting wire to form stay sections of the class above described, but of course the cut lengths of wire may be used for any other purpose suitable, and it is understood that the machine is not in any way limited to the production of stay sections.

In the form of device which we have shown in the accompanying drawings as illustrating one form of the invention, the mechanism is mounted upon a framework comprising a base member 13 and upright supporting members 14. The particular style and arrangement of the framework are of course optional with the builder. For the purpose of illustrating one method of operating the mechanism, we have shown an electric motor 15 supported upon the framework, which motor drives a shaft 16, to one end of which is connected a pulley 17, from which travels a belt 18 operating a pulley 19 connected to a shaft 20, which shaft may be termed the main driving shaft of the machine. Driven through suitable gearing from the shaft 20 is a shaft 21, which has a bevel gear 22 thereon meshing with a bevel gear 23 on a shaft 24; and this latter shaft drives a series of feed rolls 25 which feed wire into the machine from a roll or other source of main supply.

The wire first passes through a straightener 26 of any suitable construction, and this straightener is operated by means of a belt 27, driven by a pulley 28 secured to the shaft 16. The wire, after passing out of the straightener, enters a tube 29, best shown in Fig. 5; and the opening in this tube is positioned so that it alines with the upper of a series of grooves 30 which extend longitudinally of a shaft 31. This grooved shaft is what is referred to as the holder, receptacle or pocketed member, for the length of wire. The shaft is rotated by means of a gear 32 mounted upon a stub shaft 33. The teeth of the gear 32 mesh with the teeth of a gear 34 secured to the shaft 31. The gear 32 is intermittently operated through the medium of a pawl and ratchet mechanism 35, best shown in Fig. 4; and the pawl and ratchet are in turn operated through a link 36 connected to a crank arm 37 driven from the shaft 20. Thus an intermittent movement is given to the shaft 31; and this movement is sufficient to move the shaft a distance equal to the spacing of the grooves on said shaft; that is to say, if there are four grooves in the shaft,—which there are in the construction shown—the shaft will be moved a quarter revolution at each operation of the gears 32 and 34.

After a predetermined amount of wire has been fed into the groove which is in alinement with the tube 29, it is necessary to sever this length of wire from the mass of wire. In order to accomplish this, we place tool steel at the end of the shaft 31 adjacent to the tube 29, and form the end of the tube adjacent to the shaft of tool steel. The tube of course is fixed, and when the shaft revolves, the two adjoining edges of tool steel will operate to sever the wire at that point, so that a length of wire is placed within the slot, which is free of the main portion of wire. This severing mechanism may be referred to as the primary cutting mechanism. In moving the shaft 31 in the manner described, it is of course necessary to stop the feeding of wire during the periods of movement of the shaft, the reason obviously being that until a groove is properly positioned to receive the wire coming through said tube 29, no passage of the wire out from said tube is possible. The mechanism which we have shown for the purpose of stopping this feeding movement is probably best illustrated in Figs. 1, 7, 8 and 9, and consists of a series of relatively short rods 38, one rod being positioned in each groove 30 of the shaft 31; and each rod 38 has adjustably secured therto a block 39, each block being mounted in a slot 40 in the shaft 31, said slots being in fact a portion of the grooves. These blocks 39 are adapted to bear against a collar 41 slidably mounted on the shaft 31; and the collar 41 has secured thereto a forked arm 42 pivoted at 43; and connected to this arm 42 is a link 44, which actuates a bell crank lever 45, best shown in Fig. 1, which lever operates a clutch mechanism 46, which clutch mechanism controls the movements of the feed rolls 25. The arm 42 is mounted in a manner to hold the collar 41 against rotative movement. Hence, the only movement which this collar has is a sliding one back and forth along the shaft 31. The collar 42 is provided with a series of teeth 47, which are adapted to be engaged by teeth 48 formed with a collar 49, which latter collar is keyed or otherwise secured to the shaft 31, and is, therefore, rotated in unison with said shaft.

The operation of this portion of the mechanism is as follows: One of the grooves 30 is positioned in alinement with the tube 29. The feed mechanism acts to force the wire through the straightener 26, through the tube 29, and into the groove in the shaft 31 positioned to receive it. After the wire has been fed into the groove a predetermined distance, it engages the end of the rod 38 lying within said groove. The engagement of said rod and the further advancement of the wire forces the block 39 attached to said rod, in the direction of movement of the wire, and forces the collar 41 along the shaft 31 and toward the collar 49. Such a movement of the collar 41 swings the arm 42, and, through the medium of the link 44, operates the bell crank lever 45 to throw the clutch mechanism 46 to stop the feed of the wire. Immediately after the cessation of the feeding operation, the shaft 31 begins to revolve through the medium of the gears 32 and 34. The revolving of said shaft severs the length of wire lying within the slot 30 from the main body of wire.

It is necessary to provide mechanism for causing the feeding mechanism to resume its operation after the shaft has completed a movement. This is done as follows: The teeth 47 and 48 are so arranged with respect to one another that a rotative movement of the collar 49 will cause the teeth 48 to exert a camming action on the teeth 47 of the collar 41, to force this latter collar back to its original position on the shaft 30, such backward movement returning the arm 42 into the position shown in Fig. 7 and again placing the feed in operation. It is desirable, however, to permit the shaft 31 to rotate a predetermined distance before the backward movement of the collar 41 commences, and hence the teeth 47 and 48 are so arranged with respect to one another that the collar 49 will revolve through the major portion of its revolutionary movement before its teeth 48 engage the teeth 47, and thus the backward movement of the collar 41 will take place toward the end of the movement of the shaft 31.

The blocks 39 must of course be returned to their original position, and to accomplish this, one face of the ring 41 is provided with a sloping cam portion 52. In moving the sleeve 41 inward, the block which has moved the collar inward will likewise be moved inward a corresponding distance, but the remainder of the blocks will remain stationary. These blocks which are moved inward must be returned to their original position, so that they can again be moved inward to effect a movement of the sleeve, but such returning movement cannot take place before the wire has been discharged from the groove in the shaft 38 in which said block is lying, the block being connected to the rod 38 and the rod bearing against the wire in the slot. Obviously, no movement of said rod against said wire can take place without bending the wire or forcing it out of the slot. It is to allow these blocks to remain in the same position until the wire is discharged from the slot 38 that the sleeve 41 is cut away, as indicated by the numeral 50. The block which has effected the movement of the sleeve 41 will be carried by the revolution of the shaft 31 into position so that it will be in alinement with the cutaway portion of the sleeve 41; and the cutaway portion is of a depth equal to the length of movement of the sleeve 41. Hence, when said sleeve 41 returns, the block which effected the movement, being in alinement with the cutaway portion, will not be moved by the sleeve when the sleeve returns, but will remain in the position it assumed when it forced the sleeve into the position shown in Fig. 8. This will be clearly understood by referring to Figs. 7, 8 and 9, in which a block marked A may be seen in its various positions. After the shaft 31 has been revolved sufficiently so that the wire is discharged from the groove 30, then the block in said groove from which the wire has been discharged will be engaged by the cam surface 52 of the collar 41 and moved into position where it will engage the protruding portion of the collar 41 and be in position to again shift said collar. Thus we have a feeding of the wire into a holder, a severing of the wire to leave a length in the holder, a movement of the receiver, and a simultaneous stoppage of the feeding mechanism; then a stoppage of the receiver and a movement of the feeding mechanism. The stoppage of the feeding mechanism being controlled by the feed of the wire, said stoppage of the feed will necessarily be properly timed.

The wire when it is discharged from the slot 30 falls into a pocket formed in a toothed wheel 53. By referring to Fig. 2, it will be seen that there are a plurality of these wheels arranged across the machine, so that a relatively long length of wire can be handled. The wheels 53 are mounted on a shaft 54, which is revolved in a step by step movement; and a shield or guard 55 is provided, which is arranged at the side of the wheels 53 and the shaft 31, so that the lengths of wire carried by said wheels and shaft will not drop out before the time desired for their discharge from these members. Located below the wheels 53, which may be termed the means for transferring the severed lengths of wire from the receiver to the cutting mechanism, is a series of knives 56, a portion of which are mounted upon a fixed table 57 and a portion of which are mounted upon a movable table 58, the cutters on the tables 57 and 58 coöperating in the ordinary manner to sever the wire when the knives move past one another. The above referred to cutting mechanism may be termed the secondary cutting mechanism. The wire lettered W, in dropping out from the toothed wheels 53, drops into the position between the knives indicated in Fig. 3 and rests upon a plurality of pins or like supporting members 59. After such depositing of the length of wire, it is desirable to position this length in proper relation to the cutting mechanism, whereby a plurality of equal lengths will be cut, it being understood that there is one fewer set of knives than there are cut sections produced, and hence the ends of the lengths of wire must be spaced away from the knives the exact distance of a cut section. In order to effect this, we provide a plunger 60, best shown in Fig. 5, which is actuated by a lever 61, best shown in Fig. 1; and the lever in turn is operated by a cam 62 on the driving shaft 20. Thus after each length of wire is deposited in position to be cut into sections, the plunger 60 operates to place the length of wire in position to properly space it with respect to the knives, said plunger acting to force the wire farther inward than said wire would ordinarily be placed, and so placing it always in the same position. The movable table 58 is operated by eccentrics 63 and links 64; and it is obvious that as the table 58 is forced toward the table 57, through the actuations of the eccentrics 63, the knives 56 will sever the length of wire at intervals, so that a series of cut sections are produced, corresponding in length to the distance of the knives apart.

To vary the length of the cut sections, the knives 56 may be adjusted so as to be placed in any desired position. The means shown for holding the knives in place permit of this, said means consisting simply of plates 65 held by bolts 66. The supports 59 are of such a nature that, after the severing operation has been completed to produce the cut sections, said sections will fall into the space below the tables 57 and 58, and can then be collected in any manner desired. The means which we have shown for operating the shaft 54 consists of a dog 69 carried by the movable table 58, which dog engages the teeth of a toothed wheel similar to the toothed wheel 53. In the arrangement shown, the shaft 54 is operated at the time the table 58 is moved to withdraw the cutters from operative relation to one another. The end of the shaft 31 adjacent to the tube 29 is held in bearings 67. These bearings are cut away, as indicated at 68 in Fig. 6, to permit the length of wire to fall from the groove 30 when the shaft 31 has been revolved to bring the wire in position to be discharged.

If for any reason the mechanism described for stopping and starting the feed of the wire should not operate, a cam 68ª is provided, which is secured to the shaft 20 which engages with the roller 69. This cam will move the bell crank lever 45 to effect a stopping of the feed mechanism while the shaft is being revolved, in case the length of wire does not operate the collar 41 in the manner to effect the stopping.

The operation is as follows: A length of wire is fed into one of the grooves 30. After a certain length of wire has been fed in, the rod 38 is moved, which moves the block 39 in said groove to engage and shift the collar 41 and move the clutch 46 to stop the feeding operation. The shaft 31 is then revolved through the actuations of the gears 32 and 34, and the length of wire within said slot 30 is severed from the main body of wire. A new slot is then brought into position to receive a length of wire and the same operation gone through with. Upon the second movement of the shaft in the construction shown, the first cut length of wire drops from the groove in which it was positioned and into a recess in the wheel 53. Then, upon a movement of the wheel, the length of wire is carried to the point where it drops by gravity from said wheel and in between the knives 56. Then, when the table 58 is forced toward the table 57, this length of wire is cut into a series of sections. It is obvious that after the first piece of wire has been forced down into position to be operated on by the cutting mechanism, the operation will be practically continuous. As heretofore stated, the rods 38 are adjustable. Obviously, by changing the position of the ends of these rods, a greater or less amount of wire will be fed into each slot 30.

We claim:

1. In a wire cutting machine, the combination of a primary cutting mechanism for severing a length of wire from a mass, secondary cutting mechanism for cutting said length into sections, and means operatively connected for actuating said secondary cutting mechanism after the primary cutting mechanism has completed its cutting operation, substantially as described.

2. In a wire cutting machine, the combination of mechanism for severing a length of wire from a mass, mechanism for cutting said severed length into a plurality of sections, and means operatively connected for actuating said severed mechanism and said cutting mechanism, substantially as described.

3. In a wire cutting machine, the combination of means for automatically feeding wire from a main body, means for severing a length of said fed wire from the main body, a series of cutting mechanisms for cutting said severed length into sections, and means for delivering said severed length into position to be acted upon by said cutting mechanisms, substantially as described.

4. In a wire cutting machine, the combination of means for feeding wire from a main body, means for severing a length of said fed wire from the main body, means for straightening the wire during the feeding operation, a series of cutting members for cutting said severed length into sections, and means for delivering said severed length into position to be acted upon by said cutting members, substantially as described.

5. In a wire cutting machine, the combination of means for feeding wire from a main body, means for severing a length of said fed wire from the main body, a receptacle for receiving said severed length, mechanism for cutting said severed length into sections, and means for placing said severed length in position to be acted upon by said cutting mechanism, substantially as described.

6. In a wire cutting machine, the combination of means for feeding wire from a main body, an intermittently movable receptacle for said fed wire, means actuated by the movements of said receptacle for severing a length of wire fed into the receptacle from the main body of wire, means for stopping the feed of the wire during the periods of movement of the receptacle, and means for cutting the several lengths of wire into sections, substantially as described.

7. In a wire cutting machine, the combination of means for feeding wire from a main body, an intermittently movable receptacle for said fed wire, means actuated by the movements of said receptacle for severing a length of wire fed into the receptacle from the main body of wire, means for stopping the feed of the wire during the periods of movement of the receptacle, means for cutting the severed length of wire into sections, and means for delivering said length of wire from said receptacle into position to be acted upon by said cutting mechanism, substantially as described.

8. In a wire cutting machine, the combination of a shaft having a longitudinal slot therein, means for feeding a length of wire into said slot from a main body thereof, means for severing said length from the main body of wire, means for intermittently moving said shaft to discharge the length of wire therefrom, mechanism for cutting said length into sections, and means for placing said discharged length into position to be acted upon by said cutting mechanism, substantially as described.

9. In a wire cutting machine, the combination of mechanism for feeding a length of wire from a main body, a holder to receive said fed length, means for severing said length from the main body of wire, means for cutting said length into sections, and means for placing said severed length into position to be acted upon by said cutting means, substantially as described.

10. In a wire cutting machine, the combination of means for feeding wire from a main body thereof, a shaft provided with a plurality of longitudinally extending slots, means for actuating said shaft to successively position the slots to receive the fed wire, means for severing said fed length of wire from the body, mechanism for cutting said severed lengths into sections, and means for discharging the severed lengths from the slots and placing them in position to be acted upon by said cutting mechanism, substantially as described.

11. In a wire cutting machine, the combination of a receptacle for a length of wire, means for feeding said length from a main body and into said receptacle, means for severing said length from the main body of wire, means operatively connected for discharging the severed length of wire from said receptacle, means for cutting said discharged length into sections, and means actuated in a step by step movement for conveying the discharged length into position to be acted upon by said cutting mechanism, substantially as described.

12. In a wire cutting machine, the combination of a receptacle for a length of wire, means for feeding said length from a main body and into said receptacle, means for severing said fed length from the main body of wire, means operatively connected for discharging the length of wire from said receptacle, means for cutting said discharged length into sections, and a series of notched wheels actuated in a step by step movement for conveying the discharged length into position to be acted upon by said cutting mechanism, substantially as described.

13. In a wire cutting machine, the combination of a receptacle for a length of wire, means for feeding said length from a main body of wire and into said receptacle, means for severing said fed length from the main body of wire, means operatively connected for intermittently moving said receptacle to discharge the severed length of wire therefrom, means for cutting said length into sections, means for intermittently moving said cutting mechanism, the periods of movement of the receptacle and the periods of movement of the cutting mechanism to acting position being simultaneous, and means actuated intermittently, for conveying the discharged length into position to be acted upon by said cutting mechanism, the periods of movement of said conveying mechanism occurring during the periods of rest of the receptacle and during the periods of movement of the cutting mechanism out of acting position, substantially as described.

14. In a wire cutting machine, the combination of a receptacle for a length of wire, means for feeding said length from a main body and into said receptacle, means for severing said fed length from the main body, means operatively connected for discharging the length of wire from said receptacle, means for cutting said discharged length into sections, and means actuated in a step by step movement and by the movements of the cutting mechanism, for conveying the discharged length into position to be acted upon by said cutting mechanism, substantially as described.

15. In a wire cutting machine, the combination of a receptacle for a length of wire, means for feeding said length from a main body and into said receptacle, means for severing said fed length from the main body of wire, means operatively connected for discharging the length of wire from said receptacle, means for cutting said discharged length into sections, a series of notched wheels actuated in a step by step movement, for conveying the discharged length into position to be acted upon by said cutting mechanism, and means for preventing displacement of the length of wire during its conveyance by said notched members, substantially as described.

16. In a wire cutting machine, the combination of means for severing a length of wire from a main body, a series of cutters for cutting said severed length into sections, mechanism operatively connected for actuating said cutters, and means for positioning said length of wire to be operated upon by said cutters, and said cutters being adjustable with respect to one another, substantially as described.

17. In a wire cutting machine, the combination of means for severing a length of wire from a main body, a series of cutters for cutting said severed length into sections, means for positioning said length of wire to be operated upon by said cutters, and means for supporting said length in position prior to the cutting operation, and said cutters being adjustable with respect to one another, substantially as described.

18. In a wire cutting machine, the combination of means for severing a length of wire from a main body, a series of cutters for cutting said severed length into sections, mechanism operatively connected for actuating said cutters, means for placing said length of wire into position to be operated upon by said cutters, and means for positioning said length of wire with respect to said cutters, and said cutters being adjustable with respect to one another, substantially as described.

19. In a wire cutting machine, the combination of means for feeding wire from a main body, means for severing lengths of said fed wire from the main body, means for arresting the movement of the feed actuated by engagement of the fed wire, and means for cutting the severed lengths into sections, substantially as described.

20. In a wire cutting machine, the combination of means for feeding a length of wire from a main body, a holder for said fed length, means for severing said length from the main body, means for moving said holder to advance the severed length to discharging position, cutting mechanism for cutting said length into sections, and means operated by the engagement of the fed length of wire for stopping the feeding operation during the periods of movement of the holder, substantially as described.

21. In a wire cutting machine, the combination of means for feeding a length of wire from a main body of wire, a shaft provided with a series of longitudinal grooves, each adapted to receive one of said lengths, means for severing said lengths of wire from the main body, means for intermittently revolving said shaft to discharge the lengths therefrom and to successively position the slots to receive the fed wire, means for cutting said discharged length into sections, a shiftable member for each groove, a connection between said shiftable members and feed mechanism, whereby the engagement of said shiftable members by said fed lengths of wire stops the feeding operation, and means for restoring the operation of the feeding mechanism after the grooved shaft has been brought to a period of rest, substantially as described.

22. In a wire cutting machine, the combination of means for feeding wire from a main body, a shaft provided with longitudinal grooves adapted to receive said fed wire, means for severing the lengths of fed wire from the body after said lengths have been positioned in said grooves, means for moving said shaft after said severing operation, to bring an empty groove into position to receive a length of wire and to advance the severed length to discharging position, slidable members in alinement with said grooves, adapted to be moved through the instrumentalities of the fed wire, a shiftable member on said shaft actuated by the movement of the slidable member, a connection between the shiftable member and feed mechanism, and means for restoring the slidable members to normal position, substantially as described.

23. In a wire cutting machine, the combination of means for feeding wire from a main body, a shaft provided with a series of longitudinal grooves adapted to receive said fed wire, means for severing the lengths of wire fed into said grooves from the main body, means for intermittently moving said shaft to position an empty groove to receive the fed wire and to advance the severed length to discharging position, a collar slidable on said shaft, a series of blocks adapted to engage and move said collar, said blocks being operated by engagement of the wire fed into the grooves, and a connection between the collar and feeding mechanism, whereby the movement of said collar by said blocks stops the operation of the feeding mechanism, substantially as described.

24. In a wire cutting machine, the combination of means for feeding wire from a main body, a shaft provided with a series of longitudinal grooves adapted to receive said wire, means for severing the lengths of wire fed into one of said grooves from the main body, means for intermittently moving said shaft to position an empty groove to receive the fed wire and to advance the severed length to discharging position, a collar slidable on said shaft, a block adapted to engage and slide said collar, said block being moved by engagement with the fed wire, a lever connected to said collar, clutch mechanism for controlling the movements of the feeding means, and a connection between the lever and the clutch mechanism, substantially as described.

25. In a wire cutting machine, the combination of means for feeding wire from a main body, a shaft provided with a series of grooves adapted to receive said fed wire, means for severing from the main body the lengths of wire fed into said grooves, a slidable member alined with each groove, adapted to be moved through the instrumentalities of the fed wire, a shiftable member on the shaft moved through the agency of the slidable member, a connection between said shiftable member and feeding means, means for returning the shiftable member to normal position, and a surface on said shiftable member configured to effect a return of the slidable members to normal position, substantially as described.

26. In a wire cutting machine, the combination of means for feeding wire from a main body, a shaft provided with a series of grooves adapted to receive said fed wire, means for severing from the main body the lengths of wire fed into said grooves, a slidable member alined with each groove, adapted to be moved through the instrumentalities of the fed wire, a shiftable member on the shaft moved through the agency of the slidable member, a connection between said shiftable member and feeding means, a fixed member on the shaft adapted to engage and return the shiftable member to normal position, and a surface on said shiftable member configured to effect a return of the slidable members to normal position, substantially as described.

27. In a wire cutting machine, the combination of means for feeding wire from a main body, a shaft having grooves adapted to receive said fed wire, means for severing said fed length from the main body, a collar fast on said shaft, a collar loose on said shaft, means actuated by engagement of the fed length of wire for shifting the loose collar, a connection between said loose collar and feeding means, whereby a movement of said collar causes a stopping of the feeding operation, teeth on the loose collar, and teeth on the fixed collar, the engagement of said teeth forcing the loose collar back to original position and permitting a re-commencement of the feeding operation, substantially as described.

FRANK H. NULLMEYER.
CARL A. PORATH.

Witnesses:
HORACE G. WILSON,
W. K. WILSON.

Copies of this patent may be obtained for five cents each, by addressing the "Commissioner of Patents, Washington, D. C."